United States Patent
Yao

(10) Patent No.: US 12,208,050 B2
(45) Date of Patent: Jan. 28, 2025

(54) EXERCISE APPARATUS AND METHOD THEREOF

(71) Applicant: HANGZHOU GUDI LIFE TECHNOLOGY CO., LTD., Zhejiang (CN)

(72) Inventor: Qian Yao, Zhejiang (CN)

(73) Assignee: HANGZHOU GUDI LIFE TECHNOLOGY CO., LTD., Zhejiang (CN)

( * ) Notice: Subject to any disclaimer, the term of this patent is extended or adjusted under 35 U.S.C. 154(b) by 790 days.

(21) Appl. No.: 17/257,218

(22) PCT Filed: Jul. 31, 2019

(86) PCT No.: PCT/CN2019/098646
§ 371 (c)(1),
(2) Date: Dec. 30, 2020

(87) PCT Pub. No.: WO2020/057267
PCT Pub. Date: Mar. 26, 2020

(65) Prior Publication Data
US 2021/0128401 A1    May 6, 2021

(30) Foreign Application Priority Data

Sep. 23, 2018  (CN) .......................... 201811111358.6
Dec. 28, 2018  (CN) .......................... 201811621213.0

(51) Int. Cl.
*A63C 17/12*   (2006.01)
*A61H 23/00*   (2006.01)
(Continued)

(52) U.S. Cl.
CPC ....... *A61H 23/006* (2013.01); *A63C 17/0006* (2013.01); *A63C 17/12* (2013.01);
(Continued)

(58) Field of Classification Search
CPC ............ A61H 23/006; A61H 2201/164; A63C 17/0006; A63C 17/12; A63C 2203/12;
(Continued)

(56) References Cited

U.S. PATENT DOCUMENTS 7,322,904 B2 *  1/2008  Takizawa ............. A63B 22/203
                                                        482/8
7,520,003 B2 *  4/2009  Meyers .................. A47K 3/002
                                                        4/583
(Continued)

FOREIGN PATENT DOCUMENTS

CN       106846978 A      6/2017
CN       107008000 A  *   8/2017
(Continued)

OTHER PUBLICATIONS

Translation of CN107008000A accessed at www.espacenet.com on Sep. 9, 2023. (Year: 2017).*

*Primary Examiner* — James A Shriver, II
*Assistant Examiner* — Hilary L Johns
(74) *Attorney, Agent, or Firm* — MUNCY, GEISSLER, OLDS & LOWE, P.C.

(57) ABSTRACT

An exercise apparatus and a method thereof relate to the technical fields of physical exercise, training instruments, life cultivation and health preservation, leisure and entertainment, teaching appliances, smart home and the like. Through reverse thinking, by changing a shape, a structure, a function, a control method or/and a using method of an electric scooter, the electric scooter is switched to the fields of physical exercise or/and learning and education. By means of technical characteristics in an attempt to avoid by the technical staff, unexpected technical effects are achieved, and a new purpose of the electric scooter is achieved. The exercise apparatus carries a user to perform automatic round-trip movement, the user correspondingly adjusts
(Continued)

physical and mental states to prevent from falling and the exercise apparatus is helpful for improving abilities of balancing, coordination, relaxation, flexibility, concentration and contingency of the user.

10 Claims, 1 Drawing Sheet

(51) Int. Cl.
    *A63C 17/00*     (2006.01)
    *B62K 3/00*     (2006.01)

(52) U.S. Cl.
    CPC ........ *B62K 3/002* (2013.01); *A61H 2201/164* (2013.01); *A63C 2203/12* (2013.01); *A63C 2203/22* (2013.01); *B62K 2202/00* (2013.01)

(58) Field of Classification Search
    CPC . A63C 2203/22; B62K 3/002; B62K 2202/00
    USPC .................................................... 280/87.042
    See application file for complete search history.

(56) References Cited

U.S. PATENT DOCUMENTS

| | | | | |
|---|---|---|---|---|
| 9,376,155 | B2* | 6/2016 | Ying | B62D 51/02 |
| 9,464,409 | B2* | 10/2016 | Magaki | E02F 9/26 |
| 10,604,382 | B2* | 3/2020 | Morimoto | B01D 53/9431 |
| 11,133,124 | B2* | 9/2021 | Inkinen | H01F 7/206 |
| 2002/0183663 | A1* | 12/2002 | Lu | A61H 1/003 601/28 |
| 2004/0030919 | A1* | 2/2004 | Moriya | E02F 9/2296 726/35 |
| 2004/0198564 | A1* | 10/2004 | Takizawa | A63B 22/203 482/68 |
| 2005/0193747 | A1* | 9/2005 | Kajimoto | B60H 1/00778 62/133 |
| 2006/0207011 | A1* | 9/2006 | Meyers | A47K 3/002 4/583 |
| 2014/0297156 | A1* | 10/2014 | Magaki | E02F 9/26 701/101 |
| 2015/0015103 | A1* | 1/2015 | Isoda | F01P 7/026 310/71 |
| 2015/0113828 | A1* | 4/2015 | Yang | A43B 7/1435 267/142 |
| 2017/0240387 | A1* | 8/2017 | Morimoto | F01N 11/00 |
| 2017/0248946 | A1* | 8/2017 | Ogura | A01B 69/008 |
| 2018/0057319 | A1* | 3/2018 | Hirate | B66C 13/00 |
| 2018/0086400 | A1 | 3/2018 | Cordero | |
| 2019/0170052 | A1* | 6/2019 | Dudar | F02D 41/0087 |

FOREIGN PATENT DOCUMENTS

| | | |
|---|---|---|
| CN | 108815831 A | 11/2018 |
| CN | 109966714 A | 7/2019 |

* cited by examiner

EXERCISE APPARATUS AND METHOD THEREOF

TECHNICAL FIELD

The present invention relates to the technical fields of physical exercise, training instruments, life cultivation and health preservation, leisure and entertainment, teaching appliances, smart home and the like, in particular to an exercise apparatus and method thereof.

BACKGROUND

An existing electric scooter has the main design purposes of riding and transportation and has the main design objectives of smoothness and comfortability. In order to prevent a user from being thrown down, the existing electric scooter needs gentle start-stop process, driving process and reversing process, needs manual intervention in direction switching and speed varying and does not have functions of automatic reversing and speed varying. Those of skill in the art are not intended to and motivated to add or make improvement for functions contrary to the objectives of smoothness and comfortability either.

SUMMARY

The technical problems to be solved by this invention are as follows: through reverse thinking, by changing a shape, a structure, a function, a control method or/and a using method of an electric scooter, the electric scooter is switched to the fields of physical exercise or/and learning and education, and thus an exercise apparatus and method thereof are created; and the exercise apparatus carries a user to perform automatic round-trip movement, the user correspondingly adjusts physical and mental states to prevent from falling, and thus the learning and training exercising effect is achieved.

To solve the technical problems, the present invention adopts one technical solution as follows:

1. For an exercise apparatus and method thereof, the exercise apparatus includes a carrying assembly, an assembly of a motor(s) and a bridge, an assembly of a driven wheel(s) and a bridge, a power supply assembly and a master control board assembly, and the master control board assembly includes a circuit board, a microprocessor and a motor driving module. The exercise apparatus includes an automatic reversing functional module which is used for switching the movement direction of the motor(s) to a reverse direction at predefined intervals of distance or/and time to drive the apparatus to perform automatic round-trip movement.

The assembly of the motor(s) and the bridge, the assembly of the driven wheel(s) and the bridge, the power supply assembly and the master control board assembly are mounted below the carrying assembly, the power supply assembly is connected with a circuit board and the motor driving module, the motor driving module is connected with the motor(s), the microprocessor and the motor driving module are connected with the circuit board, and the microprocessor is connected with the motor driving module through the circuit board; and the microprocessor automatically sends out a reversing signal to the motor driving module at predefined intervals of distance or/and time, and the motor driving module switches the motor movement direction to the reverse direction according to the received reversing signal to drive the apparatus to perform automatic round-trip movement.

Preferably, for a using method, a user stands or sits on the apparatus, faces one side perpendicular to the moving direction of the apparatus and timely adjusts the center of body weight during round-trip movement of the apparatus to prevent from not being thrown down, and therefore, the training exercising effect is achieved.

The existing electric scooters generally operate in one direction, the user faces an advancing direction, manual intervention is also needed during reversing although a few of the electric scooters have a reversing function, and the user has psychological preparation, so that the existing electric scooters are not very helpful to physical exercise. The apparatus performs automatic round-trip movement without needing intervention by the user during reversing, and the user stands or sits on the apparatus, needs to adjust the physical and mental states at any time if wanting to prevent from not being thrown down and more needs to cope with sudden impact particularly during reversing, so that the apparatus is beneficial to physical exercise; and the apparatus is beneficial to relaxation and decompression as having the exercising effect of a "cradle" with continuous and rhythmic side-to-side rolling.

Preferably, the apparatus has hard reversing, that is the apparatus immediately moves towards the reverse direction without waiting standstill during reversing.

A few of the existing electric scooters have the reversing function and necessarily adopts soft reversing although having the reversing function, that is the electric scooters are stopped or decelerated firstly and then move towards the reverse direction to reduce the impact and guarantee smoothness and comfortability; and the apparatus can strengthen the impact to the user with round-trip hard reversing and thus improving the exercising effect.

Preferably, the apparatus has continuous automatic round-trip movement, that is the apparatus can continuously and repeatedly perform automatic round-trip movement after being started and stops till a "stop" instruction is received and/or the abnormal condition occur.

The existing electric scooter cannot perform continuous automatic round-trip movement and is mainly used outdoors or in an environment with a relatively large space; and the apparatus can perform continuous automatic round-trip movement, is more suitable for being used for training indoors and can be used in a relatively small space with a length being 2 m and a width being 1m.

The apparatus includes massotherapy assemblies.

The upper surface of each massotherapy assembly includes multiple bulges, the massotherapy assemblies are mounted over the carrying assembly and may also be integrally made on the upper surface of the carrying assembly in an engraving manner, a casting manner and a similar manner, and stimulation and acupressure on contact portions of the user can be assisted by enabling the user to stand or sit on the massotherapy assemblies.

Preferably, each massotherapy assembly is an acupressure sheet.

For an existing scooter, in order to guarantee comfortability, lightness, thinness and easiness in manipulation, the upper surface of the carrying assembly tends to be made into a slight concave shape, the surface is relatively smooth or non-slip abrasive paper is stuck on the surface, and the bulges having the acupressure exercising effect are not made on the surface.

Under the conditions in the prior art, some people selects to tread a static object such as a cobblestone slab and the acupressure sheet for exercise and life cultivation, but treading such static object is relatively boring, and the people always tries to avoid pressing pain portions which more need exercises in the treading process: while the user stands or sits on the massotherapy assemblies of the apparatus, and the gained stimulation and acupressure effects are more obvious than those gained when the user treads the static object as the user needs to cope with disturbance of the apparatus.

The apparatus includes a push-button remote controller, and an "acceleration" push-button and a "deceleration" push-button are separately arranged to precisely adjust the moving speed of the apparatus in steps.

For the apparatus, the master control board assembly further includes a wireless communication module, the wireless communication module is connected with the microprocessor directly or through a circuit board, the user operates the remote controller to send out a start instruction, a stop instruction, an acceleration instruction and a deceleration instruction, the wireless communication module receives an instruction signal from the remote controller and forwards the instruction signal to the microprocessor, and the microprocessor sends out a corresponding signal to the motor driving module to drive the motor(s) to act.

The existing electric scooter employs a throttle/rocker type remote controller, performs acceleration and deceleration by pushing and pulling a throttle/rocker and has the advantages of capabilities of performing relatively rapid acceleration and deceleration and automatic reset when the throttle/rocker is released, so that those skilled in the art are not intended to and motivated to use a push-button remote controller instead, which has the deficiencies that the user needs to continuously handle the throttle/rocker for keeping operation to cause local sustained tension of a body of the user; and precise adjustment on the moving speed in steps is difficult. The apparatus employs the push-button remote controller, the "acceleration" push-button and the "deceleration" push-button are separately arranged so as to precisely adjust the moving speed of the apparatus in steps, so that the user is easy to freely select a proper speed, and metering feedback is also facilitated; and without continuous handling of the throttle, exercise and relaxation are more facilitated.

For the apparatus, the master control board assembly includes a constant-speed roundtripping functional module, or/and an automatic speed varying roundtripping functional module, or/and a random speed varying roundtripping functional module, or/and a random distance varying roundtripping functional module, or/and a random speed varying and random distance varying roundtripping functional module or/and a functional module of crossed combination of roundtripping.

Preferably, the master control board assembly includes a highest speed setting and adjusting functional module. The user can adjust a highest speed at any time according to own preferences.

Preferably, the master control board assembly includes an immediate reversing functional module. Through the immediate reversing functional module, the user can control the apparatus to immediately perform reversing in the automatic round-trip movement process, and the microprocessor sends out a signal to control the apparatus to immediately move towards the direction reverse to an original moving direction when receiving an immediate reversing instruction.

The existing electric scooter needs manual intervention in speed varying and governing and the like, the user can perform pre-judgment before transformation to guarantee smoothness and comfortability, and the electric scooter is not suitable to automatically vary a speed when the user is unprepared to prevent the user from falling and hurting self, so that those skilled in the art are not intended to and motivated to add an automatic speed varying function, an automatic distance varying function and an immediate reversing function.

With an automatic speed varying mode, a random speed varying mode, an automatic distance varying mode, a random distance varying mode and a combination mode thereof of the apparatus, the uncertainty of disturbance is increased, the pre-judgment difficulty is correspondingly increased, and the exercising effect can be improved.

Due to deviation of an actual use environment, for example, slanting or uneven ground, deviation between a forward friction coefficient and a reverse friction coefficient, distribution deviations of the center of gravity of the apparatus and the center of gravity of the user and the like, the apparatus may gradually run to side in the automatic round-trip movement process, the immediate reversing functional module may be used for correcting the deviation or/and moving a use region in the operation process, and the apparatus does not need to be stopped in the reversing and adjusting process, so that the exercising continuity may be guaranteed, and the use experience is improved.

Preferably, the apparatus includes a display assembly mounted on the upper surface of the carrying assembly.

Preferably, the display assembly is mounted in a middle region of the upper surface of the carrying assembly.

Preferably, the master control board assembly includes a speed real-time display functional module for displaying a current operation speed in real time through the display assembly.

For the existing electric scooter, the display assembly is not provided generally; and although being provided, a few indicating lamps are used for displaying information such as switching, power and communication, do not display real-time speed information, cannot be installed on the upper surface of the carrying assembly and even cannot be installed in the middle region of the upper surface of the carrying assembly. The user needs to observe the surrounding environment and has no time to look the surface of a pedal carefully as facing the advancing direction when the existing electric scooter is used: although the display assembly is added, those of skill in the art also tend to design and install the display assembly below the pedal: although the display assembly are designed and installed the display assembly over the pedal, those of skill in the art also tend to design and install the display assembly at the front end of the pedal, so that the user can find time for head-down observation; and those of skill in the art are not intended to and motivated to design and install the display assembly in the middle region over the pedal—the middle region needs the user to turn the head for observation.

The apparatus may perform automatic round-trip movement in a relatively small space, the user generally faces the side perpendicular to the moving direction, the display assembly displays the current operation speed in real time, which is an important feedback for the user, and the user can easily adjust a favorable speed and perceive the exercising effect; and the display assembly is mounted in the middle region of the upper surface of the carrying assembly, so that the user can observe the current operation speed only needing to slightly lower the head. In the stop state, the display assembly may further display information, such as the remaining battery power.

The apparatus includes a loudspeaker, and the master control board assembly includes an audio playing module. The loudspeaker is connected with the audio playing module, the audio playing module is connected with the microprocessor directly or through the circuit board, and the microprocessor selects and plays an audio file or/and adjust a volume according to an operation instruction of the user.

Preferably, contents stored in the audio playing module includes background music, or/and classic article reading or/and exercise guidance files.

The existing electric scooter does not have the loudspeaker and the audio playing module generally, a few of the existing electric scooters use a buzzer for limited operation prompt, and the loudspeaker needs a sound passing hole generally, which is not beneficial to waterproofing. The existing electric scooter is generally used outdoors, and the environment is complex and noisy; when an audio is played, the user cannot clearly listen to the audio if the volume is low, and the audio disturbs people if the volume is high; and the waterproof and shakeproof demands are prior to audio playing, so that those skilled in the art are not intended to and motivated to add the loudspeaker and the audio playing module.

The apparatus is generally used indoors and is suitable for playing an audio content. When the user performs exercise, relaxing and intelligence promotion background music, such as alpha wave music and light music, or/and exercise guidance instructions are selected to be played, and exercise, relaxation and intelligence promotion are facilitated; and with classic article playing, the user is repeatedly edified and unconsciously influenced in the processes of exercising and relaxation of body and mind and gets better learning effect.

Preferably, the master control board assembly includes a voice prompt module which automatically plays a corresponding voice prompt when the user operates the apparatus, or/and abnormalities occur or/and other demands are required.

The user operation includes, but not limited to: one or more of starting, acceleration, deceleration, stopping, pausing, resuming, immediate reversing, round-trip distance addition, round-trip distance shortening, volume increase, volume lowering, audio file switching and the like in some an exercise (roundtripping) mode: the abnormalities which occur, include, but not limited to: one or more of locked rotor, overspeed, low power, operation errors and the like.

The apparatus includes anti-collision assemblies mounted at two ends of the moving direction.

Preferably, each anti-collision assembly includes an anti-collision switch inside, and the anti-collision switches are connected with the microprocessor or the power supply assembly, so that the apparatus automatically stops urgently when colliding a foreign object during movement.

Preferably, thicknesses/areas of the two ends of the moving direction of the carrying assembly are obviously larger than those of the existing electric scooter.

For the existing electric scooter, a pedal is relatively light and thin due to the use demands of power conservation, climbing, trick making and the like, and collision prevention is not facilitated; and without the anti-collision switches, the existing electric scooter is unsuitable for automatic urgent stopping to prevent from falling and hurting the user although colliding the foreign object during movement, and therefore, those skilled in the art are not intended to and motivated to add the anti-collision assemblies and the anti-collision switches or increase the area of an easily impacted portion.

The electric scooter, lacking anti-collision protection, very easily hurts other people and other objects, particularly very easily hurts children and pets when the children and the pets break into the electric scooter due to curiosity or accident, if being used in a small space range indoors. The apparatus is generally used indoors, so that anti-collision protection is necessarily strengthened; and furthermore, the impact on the apparatus during automatic round-trip movement reversing is larger than that from urgent stop, the user keeps alert at all times to be prevented from falling down, and automatic urgent stop cause relatively small threat to the user, so that the apparatus may have the functions of collision prevention and automatic urgent stop.

Preferably, the carrying assembly is in a housing shape for covering the assembly of the motor(s) and the bridge as well as the assembly of the driven wheel(s) and the bridge.

Preferably, a relatively large cavity, obviously larger than the same portion of the existing electric scooter, is formed below the carrying assembly and is used for accommodating the power supply assembly, the master control board assembly and the loudspeaker, and a sealing plate is mounted below the cavity for protection.

For the existing electric scooter, the pedal is relatively light and thin, and the motor(s) and a driven wheel(s) are generally exposed outsides: as the existing electric scooter needs to be adapted to an outdoor potholed and bumpy road, a chassis needs to reserve a sufficient height above the ground to avoid the road or an obstacle form colliding the chassis, and those skilled in the art are not intended to and motivated to thicken the pedal, or cover the motor(s) and the driven wheel(s) or increase the volume of a control box.

The apparatus is generally used on the flat ground indoors, the lower side of the carrying assembly is less collided, the height above the ground may be obviously smaller than that of the existing electric scooter, the motor(s) and the driven wheel(s) are covered to be capable of protecting the user, other people or other objects from being collided or bumped by the motor(s) and the driven wheel(s), and a relatively larger cavity structure is beneficial to accommodating more functional modules, increasing the volume of the played voice and improving the tone quality of the played voice.

The master control board assembly includes a two-way wireless communication functional module, through which an instruction and/or data is received from and sent to similar universal intelligent devices such as a smart phone or a tablet personal computer.

Preferably, the receivable and executable instruction or/and data includes, but not limited to, one or more of the aforementioned remote controller instruction, parameter setting instruction, parameter query instruction, state query instruction and operating data reading instruction.

Preferably, the sendable data includes, but not limited to, one or more of current power data, current volume data, current exercise mode data, current speed data, current exercise mode duration data and operation statistical data.

The existing electric scooter can only receive a very small amount of instructions, such as speed governing of the remote controller, generally and cannot send out data to the remote controller or other devices. The apparatus can use similar wireless communication remote controller operations, such as infrared, Bluetooth, 2.4G and Wifi, can also use remote operations of the universal intelligent devices and can further be limited to use the remote operations of the universal intelligent devices only.

The master control board assembly includes an exercise timing functional module for automatically calculating an exercise duration each time.

Preferably, the master control board assembly includes an exercise time telling functional module for automatically calculating a current exercise duration and automatically makes the sound prompt or/and plays the voice prompt when the current exercise duration reaches a set numerical value.

Preferably, the master control board assembly includes a pause/resume functional module, through which the apparatus pauses in moving and timing after receiving a "pause" instruction from the user during current exercise, is resumed to move according to parameters and modes before pause and is resumed to perform timing based on a duration before pause after receiving a "resume" instruction from the user when in a pause state.

Preferably, the master control board assembly includes an exercise record outputting functional module for automatically outputting exercise record data, and data items include, but not limited to: one or more of apparatus identification, the exercise mode, a starting time, an ending time, the duration, the operation speed and the like.

Preferably, the master control board assembly includes that an exercise record is output to the wireless communication module, is forwarded to the similar universal intelligent devices such as the smart phone or/and the tablet personal computer by the wireless communication module and then is forwarded to a server/cloud system to be stored by the universal intelligent devices for subsequent statistical analysis, and/or social sharing and/or account settling with taking a card.

The existing electric scooter does not have the functions of exercise timing, time telling and record outputting and is relatively difficult in clear statistics during actual use, and the reference significance of a statistical result is relatively small, so that those skilled in the art are not intended to and motivated to add the functions. When the apparatus is used for exercising, the user generally has an exercise plan and hopes to timely know a lasted time and also save and share an exercise record.

The master control board assembly includes a motor rotation monitoring functional module for receiving motor rotation signals and performing statistics on the motor rotation signals in real time.

Preferably, the master control board assembly includes an automatic parking functional module, through which the apparatus brakes automatically when not in a started state, releases the brake automatically when being started and brakes automatically when being stopped.

Preferably, the automatic parking functional module internally includes an intelligent judgment submodule, through which the apparatus brakes automatically when the automatic parking functional module receives the motor rotation signals although the apparatus is not in the started state and releases the brake automatically if the brake duration reaches a set value, so that the electric energy is saved, and consumption is lowered.

Preferably, the control master board assembly includes an automatic stopping functional module, through which the apparatus automatically stops moving if the motor rotation speed is calculated to exceed a preset threshold or/and if the motor rotation speed is calculated to be lower than a set threshold value when the apparatus is in the started state.

Preferably, the control master board assembly includes a starting protection functional module, through which the motor rotation signals are continuously motored when the apparatus is not in the started state, and the apparatus automatically refuses to start up if motor rotation in a set time window exceeds the preset threshold when the apparatus receives the start instruction.

The existing electric scooter does not have the functions of motor rotation monitoring, automatic parking, automatic stopping and starting protection and is not connected to a motor rotation monitoring signal line, and the demands on these functions are relatively weak in use, so that those skilled in the art are not intended to and motivated to add these functions.

The apparatus monitors the motor rotation signals and performs statistics on the motor rotation signals in real time, can be used for analyzing and judging a motor rotation state and calculating the moving speed and the moving distance and can decide the reversing opportunity by calculating the moving distance. In order to improve the exercising effect, connection of the motor, the driven wheel(s) and a bridge of the apparatus needs to be relatively flexible, and the user can steadily stand or sit on the apparatus only needing to have certain balance ability and skills, otherwise the apparatus easily shakes or slips to side. Automatic parking is helpful for the user (particularly, a beginner) to smoothly and safely set feet on the apparatus: automatic stopping may lower risks caused by abnormalities, such as overspeed, soaring, flying rotor, locked rotor and error operation; and start refusing guarantees that the apparatus can be started only after the user steadily stands or sits on the apparatus, and thus the use safety is improved.

The master control board assembly includes an authority management module used for validating a password before starting, or/and setting of the parameters or/and outputting of the data and refusing to executing starting, setting of the parameters or/and outputting of the data if the password is incorrect.

Preferably, the master control board assembly includes a limited use time functional module used for presetting a limited use time or setting the limited use time for the apparatus through an intelligent device as needed, and through the limited use time functional module, the apparatus automatically stops or/and refuses to start if the limited use time is exceeded.

Preferably, the master control board assembly includes similar identification codes such as a literal code, or a bar code or a two-dimensional code, and the user reads or inputs the identification codes through the intelligent devices to establish communication connection with the apparatus so as to manipulate and/or rent the apparatus.

The apparatus includes a brain wave sensing assembly: the brain wave sensing assembly automatically collects brain wave data of the user and sends out the brain wave data to the microprocessor through the wireless communication module, and the microprocessor automatically adjusts the moving speed of the apparatus according to the received brain wave data of the user.

One or more index data, including, but not limited to, relaxation degree, concentration degree and alpha wave content in brain waves of the user are collected in real time to be compared with a training target value, and the apparatus automatically performs acceleration if the collected index data is larger than the training target value and automatically performs deceleration if the collected index data is smaller than the training target value, so that the user gradually approaches and maintains an optimal state, and better body building and exercise effects are achieved.

Under the conditions in the prior art, there is a learning and entertainment device employing brain wave feedback control, for example, one-way movement of a toy car, a small ball and the like is manipulated according to the concentration degree, and such apparatus is generally used by the user under the static condition, which is not very helpful for physical exercise.

Scientific research shows that people needs to keep good physical and mental states, needs usual movement, but cannot extremely exercise, as blind and extreme movements are both harmful. However, an individual is difficult to grasp the proper exercise intensity subjectively; and when the apparatus is used for practice, the user can divert attention and feel boring if the moving speed of the apparatus is too low and can feel too tense if the moving speed is too high, and both of the conditions can influence the effect. The apparatus automatically adjusts the moving speed through a brain wave feedback as well as is more objective, intuitional, convenient and efficient.

The beneficial exercising effects of the present invention are as follows:

an exercise apparatus as well as a using method and a control method thereof are created, and the existing electric scooter technology is switched to the fields of physical exercise and learning and education after being improved and innovated: by means of technical characteristics in an attempt to avoid by the technical staff, unexpected technical exercising effects are achieved, and a new purpose of the electric scooter is achieved; and the exercise apparatus is helpful for improving abilities of balancing, coordination, relaxation, flexibility, concentration and contingency of the user, so that a more convenient, relaxed and efficient physical exercise effect is achieved.

The apparatus is small in size, light in weight and low in use environment requirement, can be used in all indoor small spaces and is capable of remarkably improving the convenience, the economy and the practicability.

DETAILED DESCRIPTION OF EMBODIMENTS

Figure 1:
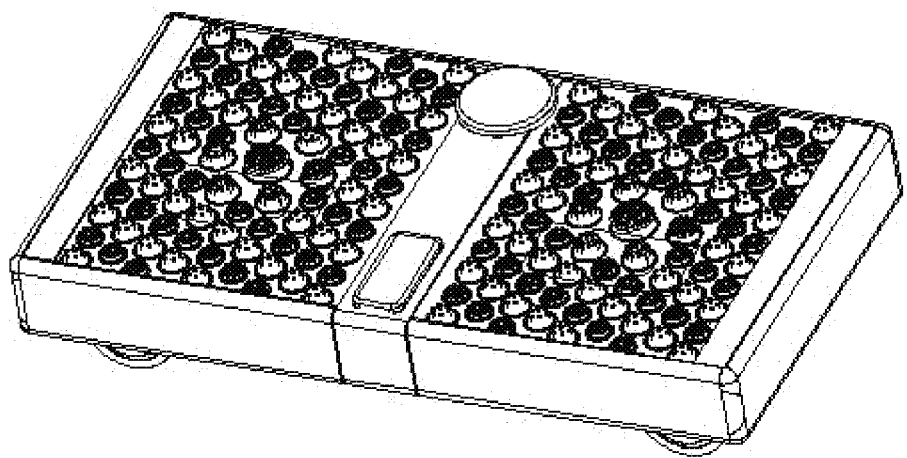
FIG. 1 is a schematic view of an outline according to the embodiments of the present invention.
Figure 2:
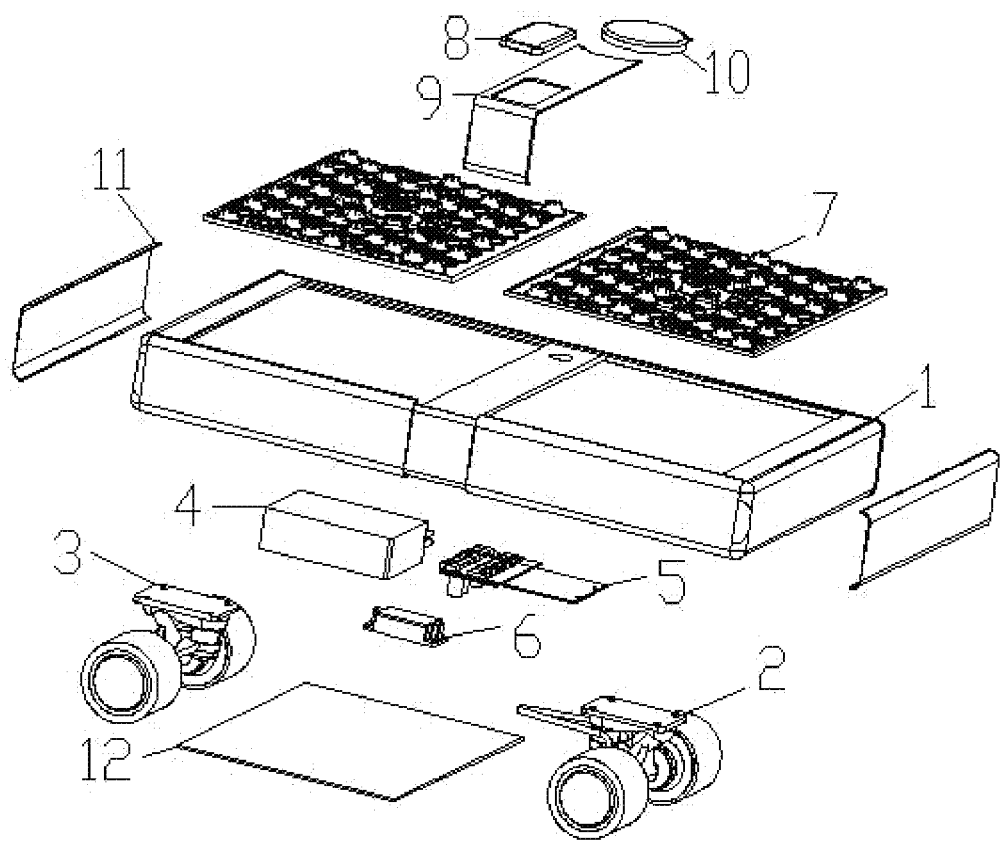
FIG. 2 is a schematic view of a structure according to the embodiments of the present invention.

FIG. 1 is a schematic view of an outline according to the embodiments of the present invention, and FIG. 2 is a schematic view of a structure according to the embodiments of the present invention.

The embodiment includes a carrying assembly 1, an assembly of a motor(s) and a bridge 2, an assembly of a driven wheel(s) and a bridge 3, a power supply assembly 4, a master control board assembly 5, a loudspeaker 6, the massotherapy assemblies 7, a remote controller 8, a remote controller bracket 9, a display assembly 10, anti-collision assemblies 11, a sealing plate 12, identification codes and the like.

The size, the shape and the material of the carrying assembly I may have many choices: for ease of description, the embodiment selects bamboos to be made into a housing shape with a length being 59 cm, a width being 31 cm and a height being 7 cm, and the carrying assembly I can cover the assembly of the motor(s) and the bridge 2 and the assembly of the driven wheel(s) and the bridge 3 when being mounted; and a cavity with a length being 20 cm, a width being 29 cm and a height being 4 cm is defined below the carrying assembly 1 by a partition plate and is used for accommodating the power supply assembly 4, the master control board assembly 5, the loudspeaker 6 and the like, and the sealing plate 12 is mounted below the cavity.

Two hub motors with a working voltage being 24V, a power being 120 W and a diameter being 72 mm as well as a standard bridge and spare parts matched with the hub motors are selected to form the assembly of the motor(s) and the bridge hub 2 described by the embodiment.

Two PU wheels with a diameter being 72 mm as well as a standard bridge and spare parts matched with the assembly of the motor(s) and the bridge 2 are selected to form the assembly of the driven wheel(s) and the bridge 3 described by the embodiment.

A power lithium battery pack with a rated voltage being 24V and a capacity being 4 AH, a power switch and a charging head are selected to form the power supply assembly 4.

A universal speaker is selected as the loudspeaker 6.

Two 25*30 cm universal acupressure sheets are selected as the massotherapy assemblies 7, the massotherapy assemblies 7 are mounted over the carrying assembly 1 and may also be integrally made on the upper surface of the carrying assembly 1 in the engraving manner, the casting manner and the similar manner.

Similar wireless communication remote controllers, such as infrared, Bluetooth, 2.4G and Wifi, may be selected, and the embodiment selects a universal 38K small infrared remote controller as the push-button remote controller 8.

Materials, such as the bamboos or acrylic materials, are used to fabricate the remote controller bracket.

Components, such as digital tubes, an LED light strip and a display screen, are made into the display assembly 10, and the embodiment selects a 16-bit WS2812 5050 RGB LED full-color RGB circular lamp ring module, a protective cover and the like to be made into the display assembly 10.

Universal buffer pads may be selected to be made into the anti-collision assemblies 11, each anti-collision assembly 11 contains an anti-collision switch (for example, a batten switch) stuck to the two ends of the carrying assembly 1, the carrying assembly 1 of the embodiment already has a certain anti-collision effect as the areas of the two ends of the carrying assembly are relatively large, and the anti-collision assemblies 11 may also be omitted.

The literal code, the bar code, the two-dimensional code or the like may be used to make the identification codes, and the embodiment selects the two-dimensional codes of applets, public accounts and the like, such as Wechat or Alipay, to paste or print the two-dimensional codes on the surface of the apparatus.

The assembly of the motor(s) and the bridge 2, the assembly of the driven wheel(s) and the bridge 3, the power supply assembly 4 and the master control board assembly 5 are mounted below the carrying assembly 1. The height of each massotherapy assembly 7 above the ground needs to be controlled in a relatively safe range. The embodiment has the basic outline size about of 59 cm in length, 31 cm in width and 13 cm in height and is suitable for being used indoors.

The master control board assembly 5 includes the circuit board, the microprocessor, the motor driving module, the audio playing module, the wireless communication module and conventional components, such as step-down transformers, diodes, capacitors, resistors, sockets, pins and plug wires, well known to those skilled in the art.

Similar universal devices, such as a single chip microcomputer or a card computer, may be selected as the microprocessor, for example, Arduino, STM32, C51, Raspberry Pi or the like, contain more standard input/output ports and can load program files; and the embodiment selects an Arduino card computer as the microprocessor, and the microprocessor is loaded with processing and control program files of the embodiment.

There are various universal motor driving modules available on the market, and the embodiment selects double-drive, direct-current and brushless Hall hub motor control board with hard reversing and large power, a working voltage of which is 12-36V, as the motor driving module.

There are various universal audio playing modules available on the market, and the embodiment selects a universal micro MP3 player and a MicroSD memory card capable of being plugged into the universal micro MP3 player to form the audio playing module.

The wireless communication module corresponding to the similar wireless communication remote controllers, such as infrared, Bluetooth, 2.4G and Wifi, may be selected, and the embodiment selects an infrared receiving head matched with the universal 38K small infrared remote controller for one-way wireless communication and a universal Bluetooth module for two-way wireless communication.

The power supply assembly 4 is connected with the circuit board and the motor driving module, phase wire output ports of the motor driving module are sequentially connected with phase wire input ports of the motor, Hall wires are sequentially connected with Hall wires of the motor (the existing electric scooter does not need to be connected with the Hall wires generally, and the embodiment should be connected with Hall wires to monitor the motor rotation signals), the microprocessor, the motor driving module, the audio playing module, the wireless communication module, the loudspeaker 6, and the anti-collision switches are connected with the circuit board, the microprocessor is separately connected with the motor driving module, the audio playing module, the wireless communication module and the anti-collision switches through the circuit board, and the audio playing module is connected with the loudspeaker through the circuit board or directly.

The embodiment sets various exercise modes, for example, constant-speed roundtripping, random speed varying roundtripping as well as random speed varying and random distance varying roundtripping. Each exercise mode is set to correspond to one push-button on the remote controller, and a start instruction of a corresponding exercise mode is sent out when one push-button is pressed.

Push-buttons for acceleration, deceleration, stop, pause, resume, immediate reversing, round-trip distance addition, round-trip distance shortening, volume increase, volume lowering, audio file changing and the like are further arranged on the remote controller separately.

Voice prompt files, corresponding to various push-buttons, are recorded by using a universal audio recording tool or synthesized by using a universal voice synthesis tool, other voice prompt files further include a usage instruction, a safety alert, abnormality warning and time telling prompt (for example, "five minutes", "ten minutes" and the like), and the voice prompt files are stored in the MicroSD memory card in the audio playing module in advance.

Preferably, suggested that the user own or/and the kinsfolk and the teachers use the universal audio recording tool to record the exercise main rule, the classic articles and the like, the recorded voice recordings are stored in the MicroSD memory card in the audio playing module, and the audio playing module of the apparatus accompanies to play a corresponding recording when the user performs exercise.

The using method of the apparatus are as follows: the user stands or sits on the apparatus, faces one side perpendicular to the moving direction of the apparatus and timely adjusts the center of body weight during round-trip movement of the apparatus to prevent from not being thrown down, and therefore, the exercising effect is achieved.

The apparatus is powered on, enters a ready state after being initialized and self checked and synchronously or alternately executes the operations:

1. power information or/and the welcoming animation effect and the like are displayed:
2. the voice prompt module is started: product advertisement, safety prompt and operation prompt are alternately played, and the background music, or/and classic article reading or/and exercise guidance files and the like are alternately played:
3. the motor rotation monitoring functional module, the automatic parking functional module, the starting protection functional module and an anti-collision protection module are started:
   (1) the motor rotation monitoring functional module: for monitoring the motor rotation signals and performing statistics on the motor rotation signals in real time, Hall signal changes are formed when the motor rotates, the motor driving module generates a rotation pulse through processing of the Hall signal changes of the motor to be output to a pulse port (M), and the microprocessor monitors an input port signal connected with the pulse port (M) of the motor driving module to perform statistics on the number of times of the signal changes:
   (2) the automatic parking functional module: through which the apparatus brakes automatically when not in a started state, releases the brake automatically when being started and brakes automatically when being stopped, and the apparatus brakes or releases the brake through the microprocessor by setting the output port connected with a brake port (EL) of the motor driving module into different numerical values; and the automatic parking functional module internally includes the intelligent judgment submodule, through which the apparatus brakes automatically when the intelligent judgment submodule receives the motor rotation signals although the apparatus is not in the started state and releases the brake automatically if the brake duration reaches a set value:
   (3) the starting protection functional module: through which the motor rotation signals are continuously monitored when the apparatus is not in the started state, and the apparatus automatically refuses to start up if the motor rotation speed in a set time window exceeds the preset threshold when receiving the start instruction; and
   (4) the anti-collision protection module: which monitors an anti-collision switch signal and immediately sends out a sudden stop control signal to the motor driving module when receiving a switching action signal: if the microprocessor is not used to implement a collision urgent stop function, an anti-collision switch signal line may also be connected with the power supply assembly, and power supply is cut off directly when collision is detected.
4. an instruction received by the wireless communication module is monitored; and state data is output through the wireless communication module at predefined intervals of time or/and if needed.

When the instruction received by the wireless communication module is monitored, a corresponding instruction is parsed, and the authority management module is called: a password is validated before starting, or/and setting of the parameters and/or outputting of the data, starting, setting of the parameters and/or outputting of the data are refused to execute if the password is incorrect, and the corresponding voice prompt file is play according to settings; and alternatively, the user scans the two-dimensional code through APP or applets installed in the universal intelligent devices such as the smart phone or the tablet personal computer, validates a use authority or/and a usage expiration date, online charging of the user is accepted if funds in an account are insufficient, and the user establishes communication connection with the apparatus when validation has succeeded.

When authority validation is passed, the corresponding instructions are executed, and the following types of instructions are mainly included:

1. parameter setting instructions: including volume increase, volume lowering, volume setting, audio file changing, access password setting, use time limit setting, speed limit setting and the like, wherein corresponding parameters are set according to contents of the instructions, corresponding sound or voice prompt files are played according to the presettings, and execution is performed according to the corresponding parameters.
2. data query instructions: including apparatus parameter query, operation state query, exercise record query, statistical report query and the like, wherein retrieval and statistics are performed on the corresponding data according to contents of the instructions, the corresponding data are packaged into a data packet in a predetermined format, and the data packet is output through the wireless communication module.
3. exercise mode starting instructions: through which the limited use time functional module is called-to judge whether a use time limit is exceeded or not according to a preset value: the apparatus refuses to start or/and is automatically stopped if the use time limit is exceeded, and a corresponding voice prompt file is played according to the presetting: the starting protection functional module is called if the use time limit is not exceeded; and if calling is not refused by the starting protection functional module, a corresponding voice prompt file is played according to the presetting, a corresponding exercise mode is started, and detailed description refers to subsequent sections.
4. action adjustment instructions: including acceleration, deceleration, round-trip distance addition, round-trip distance shortening, pause, resume, immediate reversing, stop and the like which are executed respectively according to different current modes and states, referring to subsequent sections for detailed description.

The corresponding exercise mode is started:

1. Current exercise mode statistical data is initialized; and the motor rotation monitoring functional module is continuously called to monitor motor rotation data and perform statistics on the motor rotation data in real time.
2. The microprocessor sets the output port connected with a speed governing port (VR) of the motor driving module into a corresponding numerical value to start the motor(s) or govern the speed.
3. The exercise record outputting functional module is called: current exercise mode starting data is output to the wireless communication module, data items include, but not limited to: one or more of apparatus identification, the exercise mode, the starting time, the ending time, the duration, the operation speed and the like, the data is forwarded to the similar universal intelligent devices such as the smart phone or/and the tablet personal computer by the wireless communication module and then is forwarded to a server/cloud system to be stored by the universal intelligent devices for subsequent statistical analysis, and/or social sharing and/or account settling with taking the card.
4. The exercise timing functional module is started: a current exercise duration is zeroed, followed by automatic timing accumulation till the current exercise mode is stopped, wherein accumulation is paused when the apparatus is in the pause state.
5. The exercise time telling functional module is started: when the current exercise duration achieves a preset parameter (for example, 5 minutes, 10 minutes and so on), the corresponding sound or voice prompt file is automatically played.
6. The automatic stopping functional module is started: when the motor rotation speed is calculated to exceed a preset upper threshold or/and the motor rotation speed is calculated to be slower than a preset lower threshold in a started state, the apparatus automatically stops moving.
7. Continuous monitoring is performed, and the instruction received by the wireless communication module is correspondingly executed: the pause/resume functional module is started; when the "pause" instruction is received, current operation parameters are saved, and the speed is set to be 0 to enable the apparatus to pause moving and timing; and when the "resume" instruction is received in the pause state of the apparatus, the operation parameters saved during pause are resumed, movement is resumed according to the parameters and the mode before pause, and timing is resumed on the basis of the exercise duration before pause.
8. The automatic reversing functional module is started: the movement direction of the motor(s) is switched to the reverse direction at predefined intervals of distance or/and time to drive the apparatus to perform automatic round-trip movement. For example, the microprocessor performs comparison on single-trip operation distances or/and performs comparison on timing intervals according to the preset parameters and sends out reversing signals to the motor driving module at predefined intervals of distance or/and time. An example of an automatic reversing detailed control method is as follows:

S0: a maximum permissible speed measuring pulse number A of single-trip movement is preset:

S1: the start instruction is waited, operation proceeds to S2 after the start instruction is received, otherwise S1 is continued:

S2: speed measuring pulse counter is initialized with a variable a=0, speed measuring pulse interruption processing is opened, a rotation speed control voltage value of a rotation speed control port is set to start the motor, and operation proceeds to S3.1 and S4 at the same time:

S3.1: when speed measuring pulse interruption signals are received, sets the variable a=a+1, and the numerical size of the variable a is compared with that of A; and if the variable a is larger than or equal to A, operation proceeds to S3.2, otherwise S3.1 is continued:

S3.2: a value, set by the microprocessor, of a digital output port connected with a positive/negative control port (Z/F) of the motor driving module is reversed to enable the apparatus to move towards the direction reverse to the current movement direction, and the variable a value is cleared to be 0, and then operation returns to the step S3.1:

S4: a stop signal is monitored, operation proceeds to S5 if the stop signal is received, otherwise S4 is continued:

S5: the rotation speed control voltage value of the rotation speed control port is set to be 0 to stop movement of the apparatus, the variable is zeroed, and then operation returns to S1, wherein the size of the round-trip distance may be preferentially selected in combination of the motor speed raising performance, the user experience effect and the size of a use space, for example, the round-trip distance is limited within 2 m if the apparatus is used by a family indoors, and the size of the round-trip distance may also be designed into a self-defined parameter and is set and adjusted by the user as needed.

An operation distance may be converted according to a speed measuring pulse cumulative number, for example, for a hub motor with a diameter being 72 cm and with 10 pairs of poles and 3 phases, an advancing distance represented by each pulse is 72*3.14/(10*3) mm; and the single-trip pulse number=desired single-trip distance/advancing distance represented by each pulse.

An automatic reversing function may be implemented by using a program module and also other methods-including using of a digital circuit or digital integrated circuit module: for example, a D trigger (toggle switch) and a preset number counter with a power-off memory function are selected to be welded to or in inserting connection to a printed circuit board, the counter is preset to be the maximum permissible speed measuring pulse number A of single-trip movement, an input port of the counter is connected with a speed measuring pulse signal port of the motor driving module, an output port of the counter is connected with an input port of the D trigger, and an output port of the D trigger is connected with the positive/negative control port of the motor driving module.

The embodiment adopts hard reversing: the motor driving module of the existing electric scooter does not accord with the hard reversing requirement, a driver chip on the motor driving module selected by the embodiment adopts a hard reversing IC chip, and the apparatus immediately moves towards the reverse direction when the reversing signal is received without waiting for standstill of the apparatus (the motor(s) stops rotating).

The embodiment adopts continuous automatic round-trip movement: the apparatus automatically continues to repeat the round-trip process as long as the "stop" instruction or the "pause" instruction is not received or the automatic stop condition is not achieved.

9. The immediate reversing functional module is started: the immediate reversing functional module sends out the signal to control the apparatus to immediately perform reversing to move towards the reverse direction when receiving the "immediate reversing" instruction.

10. Speed and round-trip distance control in various exercise modes are as follows:

(1) constant-speed roundtripping: the apparatus is started with an initial speed and an initial round-trip distance: 1 level of speed is increased/lowered respectively when the "acceleration" instruction/"deceleration" instruction is received; and 1 gear of movement round-trip distance is added/shortened respectively when the "distance addition" instruction/"distance shortening" instruction is received.

(2) random speed varying roundtripping: the apparatus is started with an initial speed and an initial round-trip distance: values are randomly taken within a range from the upper threshold to the lower threshold of the speed automatically at predefined intervals of distance (pulse number) or time to transform the speed: 1 level of the speed upper threshold is increased/lowered respectively when the "acceleration" instruction/"deceleration" instruction is received; and 1 gear of movement round-trip distance is added/shortened respectively when the "distance addition" instruction/"distance shortening" instruction is received.

(3) random speed varying and random distance varying roundtripping: the apparatus is started with an initial speed and an initial round-trip distance: values are randomly taken within a range from the upper threshold to the lower threshold of the speed automatically at predefined intervals of distance (pulse number) or time to transform the speed: 1 level of the speed upper threshold is increased/lowered respectively when the "acceleration" instruction/"deceleration" instruction is received: values are randomly taken within a range from the upper threshold to the lower threshold of the round-trip distance automatically to transform the round-trip distance; and 1 gear of movement round-trip distance upper threshold is added/shortened respectively when the "distance addition" instruction/"distance shortening" instruction is received.

(4) brain wave feedback control roundtripping: a brain wave training target value g is preset; the apparatus is started with an initial speed and an initial round-trip distance: user brain wave data i collected by the brain wave sensing assembly is monitored and received and is compared with the target value g. 1 level of speed is increased automatically if i is larger than g, and 1 level of speed is lowered automatically if i is smaller than g: the brain wave data may be one or more of combination of indexes, such as the relaxation degree, the concentration degree and the alpha wave content of the user; and preferably, in view of fluctuation of the brain wave data, the speed may be varied only when the conditions are satisfied after comparison for multiple times to avoid generation of shaking with frequent speed variation.

The brain wave sensing assembly of the embodiment may select TGAM brain wave module suite with Bluetooth communication, and a TGAM module may collect and provide indexes such as an original wave value. EEG power-elta (0.5-2.75 Hz), theta (3.5-6.75 Hz), low-alpha (7.5-9.25 Hz), high-alpha (10-11.75 Hz), low-beta (13-16.75 Hz), high-beta (18-29.75 Hz), low-gamma (31-39.75 Hz), mid-gamma (41-49.75 Hz), the concentration degree and the relaxation degree; and after the user wears the brain wave sensing assembly on the head, the brain wave sensing assembly automatically collects brain wave data of the user and sends the brain wave data to the microprocessor through the wireless communication module.

11. Stop and subsequent processing are as follows:

The motor(s) is immediately controlled to stop rotating when the "stop" instruction is received or/and abnormalities such as locked rotor, overspeed, low power and operation error occur:

the current exercise statistical data is saved and accumulated:

the exercise record outputting functional module is called: current exercise mode stopping data is output to the wireless communication module, data items include, but not limited to: one or more of apparatus identification, the exercise mode, the starting time, the ending time, the duration, the operation speed and the like, the data is forwarded to the similar universal intelligent devices such as the smart phone or the tablet personal computer by the wireless communication module and then is forwarded to the server/cloud system to be stored by the universal intelligent devices for subsequent statistical analysis, and/or social sharing and/or account settling with taking the card; and the apparatus returns to the ready state.

The embodiment method preferably employs a standing position for exercise, the user stands on the massotherapy assemblies with double feet parallel to each other, a distance between the feet being shoulder-width apart, a head and a face being straight and a body being relaxed and keeping balanced according to essentials of Chinese Wushu or Zhan Zhuang, and adjusts physical and mental states complying with the apparatus and tries to prevent from not being thrown down. The user can practice actions of the Chinese Wushu or an exercise method while preventing from not being thrown down after being gradually adapted to or sophisticated in the apparatus: the practicing action posture with at least one foot supporting for immobilization is preferable, for example, accompanying with a rhythm of round-trip movement of the apparatus, the user can better and faster understand and master the essentials of when performing Taiji cloud hands, and the exercise is very strong in rhythm sensation and has better interestingness and higher ornamental value.

The exercising effect is better if the user then practices the Chinese Wushu or other regimens such as Taijiquan after exercise by using the embodiment.

The above embodiments describe the preferred embodiments of the present invention only, not limiting the scope of the present invention, and likewise, more variants and modifications may further be made.

The invention claimed is:

1. An exercise apparatus, comprising a carrying assembly, an assembly of a first motor and a bridge, an assembly of a first driven wheel and a second bridge, a power supply assembly and a master control board assembly, wherein the master control board assembly comprises a circuit board, a microprocessor and a motor driving module; the exercise apparatus comprises massotherapy assemblies for conducing to the formation of distinct plantar tenderness, the massotherapy assemblies being located on the upper surface of the carrying assembly, each of the massotherapy assemblies being an acupressure sheet; the master control board assembly comprises an automatic reversing functional module which is used for switching the movement of the first motor to a reverse direction at predefined intervals of distance or time to drive the apparatus to perform automatic round-trip movement; the mode of switching the direction is hard reversing, that is, the apparatus moves towards the reverse direction immediately without waiting for standstill of the apparatus during reversing for continuous automatic round-trip movement, that is, the apparatus may continuously and repeatedly perform automatic round-trip movement and is stopped till a stop instruction is received or abnormal conditions occur after being started; and the exercise apparatus comprises a display assembly mounted in the middle region of the upper surface of the carrying assembly.

2. The exercise apparatus according to claim 1, wherein the master control board assembly comprises an exercise timing functional module for automatically calculating an exercise duration each time and a pause/resume functional module, through which the apparatus pauses in moving and timing after receiving a "pause" instruction from a user during current exercise, is resumed to move according to parameters and modes before pause and is resumed to perform timing based on a duration before pause after receiving a "resume" instruction from the user when in a pause state.

3. The exercise apparatus according to claim 2, further comprising a push-button remote controller, wherein a "start" push-button, a "stop" push-button, an "acceleration" push-button and a "deceleration" push-button are separately arranged to precisely adjust the moving speed of the apparatus in steps.

4. The exercise apparatus according to claim 3, wherein the master control board assembly comprises an immediate reversing functional module, through which, the user can control the apparatus to perform immediate reversing in an automatic round-trip movement process of the apparatus, the microprocessor sends out a signal to control the apparatus to immediately move towards a direction reverse to an original moving direction when receiving an immediate reversing instruction; and the master control board assembly comprises a constant-speed roundtripping functional module, or an automatic speed varying roundtripping functional module or a random speed varying roundtripping functional module, or/and a random distance varying roundtripping functional module, or a random speed varying and random distance varying roundtripping functional module or a functional module of crossed combination of roundtripping; during use, a user stands on the massotherapy assemblies of the apparatus without shoes, faces one side perpendicular to the moving direction of the apparatus and timely adjusts the center of body weight during round-trip movement of the apparatus to prevent from being thrown down.

5. The exercise apparatus according to claim 1, further comprising a loudspeaker, wherein the master control board assembly further comprises an audio play module and a voice prompt module which automatically plays a corresponding voice prompt when the user operates the apparatus, abnormalities occur or/and other demands are required.

6. The exercise apparatus according to claim 1, wherein the master control board assembly comprises a two-way wireless communication functional module, through which an instruction or data is received from and sent to similar universal intelligent devices such as a smart phone or a tablet personal computer, the instruction or the data comprises one or more of a remote controller instruction, a parameter setting instruction, a parameter query instruction, a state query instruction and an operating data reading instruction, and operating data comprises exercise duration statistics.

7. The exercise apparatus according to claim 1, wherein the carrying assembly is in a housing shape for covering the assembly of the first motor and the bridge as well as the assembly of the first driven wheel and the second bridge.

8. The exercise apparatus according to claim 1, further comprising anti-collision assemblies mounted at two ends of the moving direction respectively, each anti-collision assembly comprises an anti-collision switch inside, and the anti-collision switches are connected with the microprocessor or the power supply assembly, so that the apparatus automatically stops urgently or automatically performs reversing when approaching a foreign object during movement.

9. The exercise apparatus according to claim 1, wherein the master control board assembly comprises a motor rotation monitoring functional module for monitoring motor rotation signals and performing statistics on the motor rotation signals in real time, and an automatic parking functional module, through which the apparatus brakes automatically when the automatic parking function module receives the motor rotation signals although the apparatus is not in a started state.

10. The exercise apparatus according to claim 1, wherein the master control board assembly comprises an authority management module used for validating a password before starting, setting of the parameters and/or outputting of the data and refusing to execute starting, setting of the parameters or outputting of the data if the password is incorrect and comprises a limited use time functional module used for presetting a use time limit or setting the use time limit for the apparatus through an intelligent device as needed, and through the use time limit functional module, the apparatus automatically stops or refuses to start if the use time limit is exceeded.

* * * * *